US012736183B2

(12) United States Patent
Nagai

(10) Patent No.: US 12,736,183 B2
(45) Date of Patent: Sep. 15, 2026

(54) GAS FILLING DEVICE

(71) Applicant: TATSUNO CORPORATION, Tokyo (JP)

(72) Inventor: Katsumi Nagai, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 19/236,287

(22) Filed: Jun. 12, 2025

(65) Prior Publication Data

US 2026/0002642 A1 Jan. 1, 2026

(30) Foreign Application Priority Data

Jun. 27, 2024 (JP) ................................ 2024-103658

(51) Int. Cl.
*F17C 5/00* (2006.01)

(52) U.S. Cl.
CPC ........ *F17C 5/007* (2013.01); *F17C 2221/012* (2013.01); *F17C 2265/065* (2013.01)

(58) Field of Classification Search
CPC ..... F17C 2270/0139; F17C 2205/0376; B67D 2007/0419; B67D 7/40
See application file for complete search history.

(56) References Cited

U.S. PATENT DOCUMENTS

| | | | | |
|---|---|---|---|---|
| 2,744,788 A * | 5/1956 | Grise | B67D 7/40 | 242/380 |
| 5,727,765 A * | 3/1998 | Alvern | B67D 7/32 | 248/329 |

FOREIGN PATENT DOCUMENTS

| | | | |
|---|---|---|---|
| JP | 2022062863 | A | 4/2022 |
| JP | 7177654 | B2 | 11/2022 |
| JP | 7387096 | B2 | 11/2023 |
| KR | 20220014282 | A | 2/2022 |
| KR | 20220014283 | A | 2/2022 |
| WO | 2017203721 | A1 | 11/2017 |

OTHER PUBLICATIONS

EPO Written Opinion for Corresponding EP Application (Year: 2025).*
JP7177654 and English Translation (Year: 2026).*
JP7387096 and English Translation (Year: 2026).*
Extended European Search Report for Application No. EP 25 18 4524; mailed Nov. 10, 2025.

* cited by examiner

*Primary Examiner* — Timothy P. Kelly
(74) *Attorney, Agent, or Firm* — Stetina Garred Brucker & Newboles

(57) ABSTRACT

To provide a gas filling device that can effectively prevent the infiltration of rainwater with a simple structure. A gas filling device 1 of the present invention including: a filling mechanism for transporting gas from a gas supply source through a gas pipe; a main body housing 2 having the filling mechanism therein; a filling hose 3 connected to an outlet of the gas pipe of the filling mechanism; and a support arm mechanism 6 for supporting, via a wire 5, a filling nozzle 4 provided at a tip of the filling hose 3, wherein the support arm mechanism 6 including: an upper cover 6A having a first bent portion 6AA formed downward along its entire periphery; and a lower cover 6B having a second bent portion 6BA formed upward, wherein the second bent portion 6BA is located on an inner surface of the first bent portion 6AA.

4 Claims, 13 Drawing Sheets

【Fig. 1】
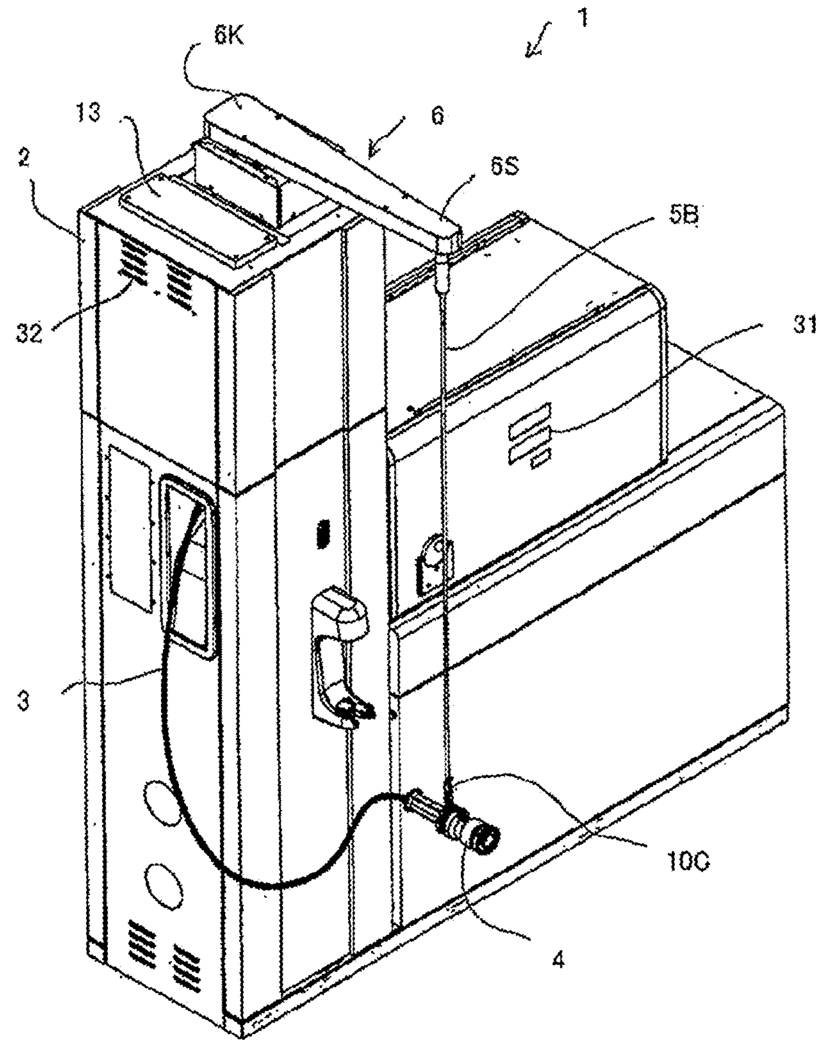

【Fig. 2】
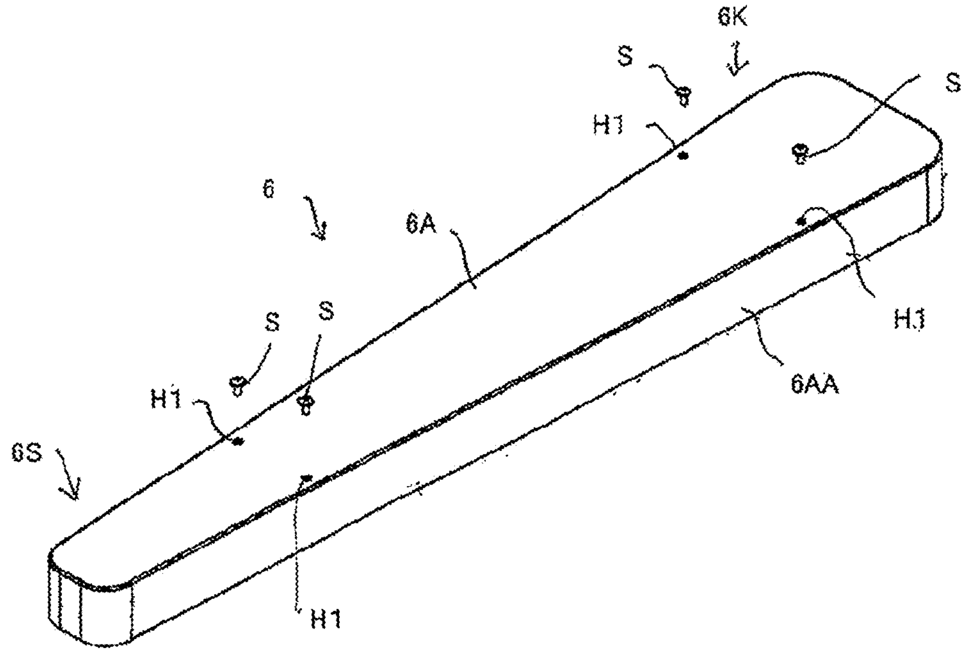
【Fig. 3】
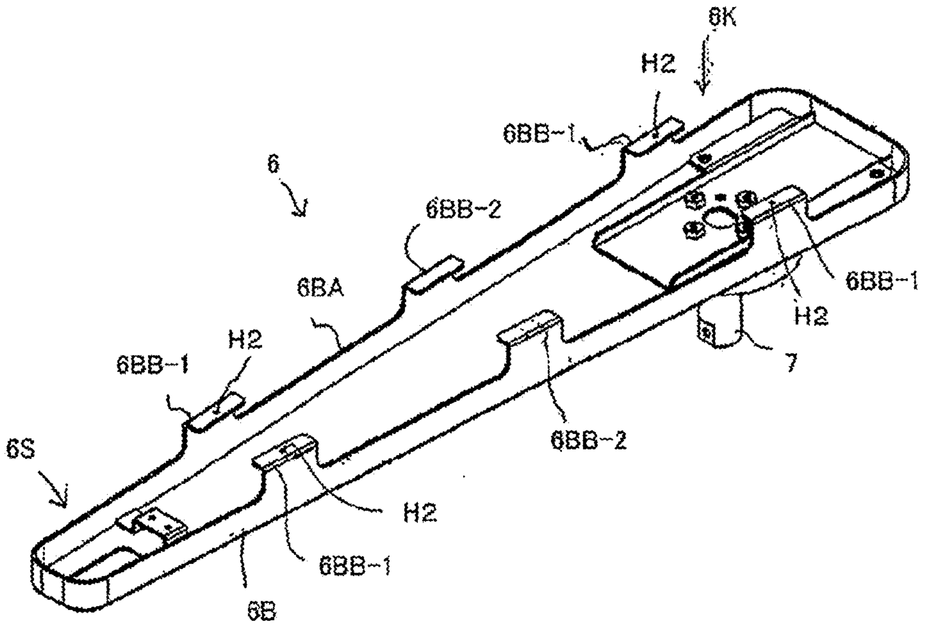

【Fig. 4】
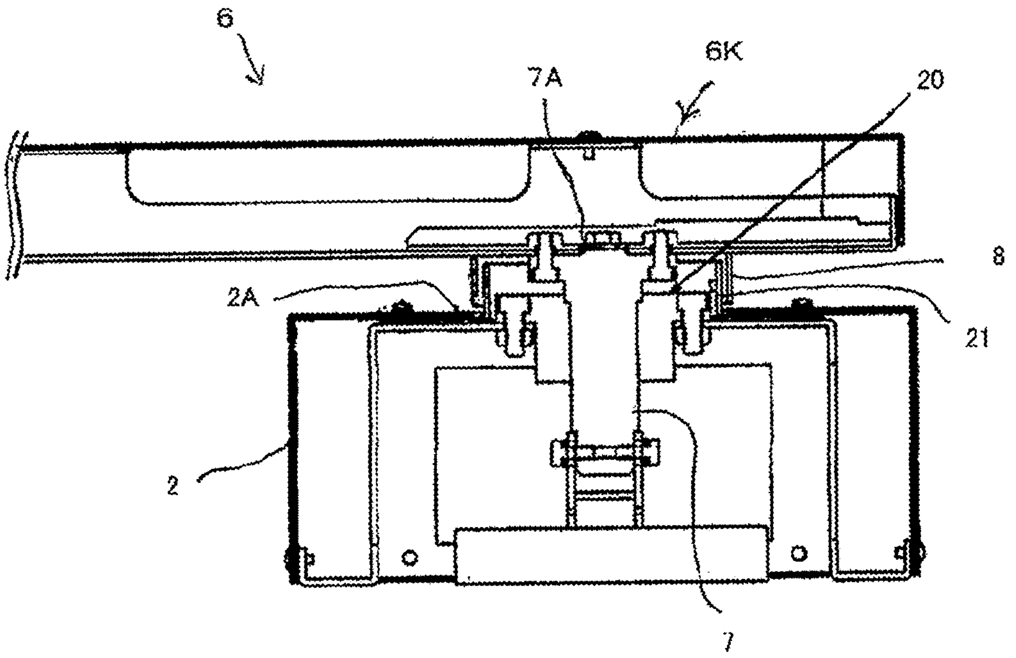
【Fig. 5】
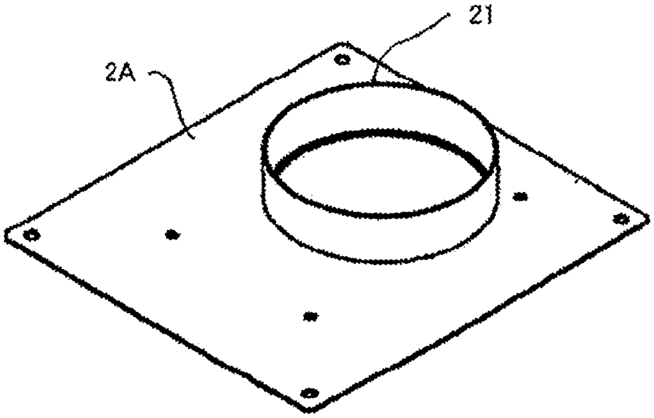

【Fig. 6】
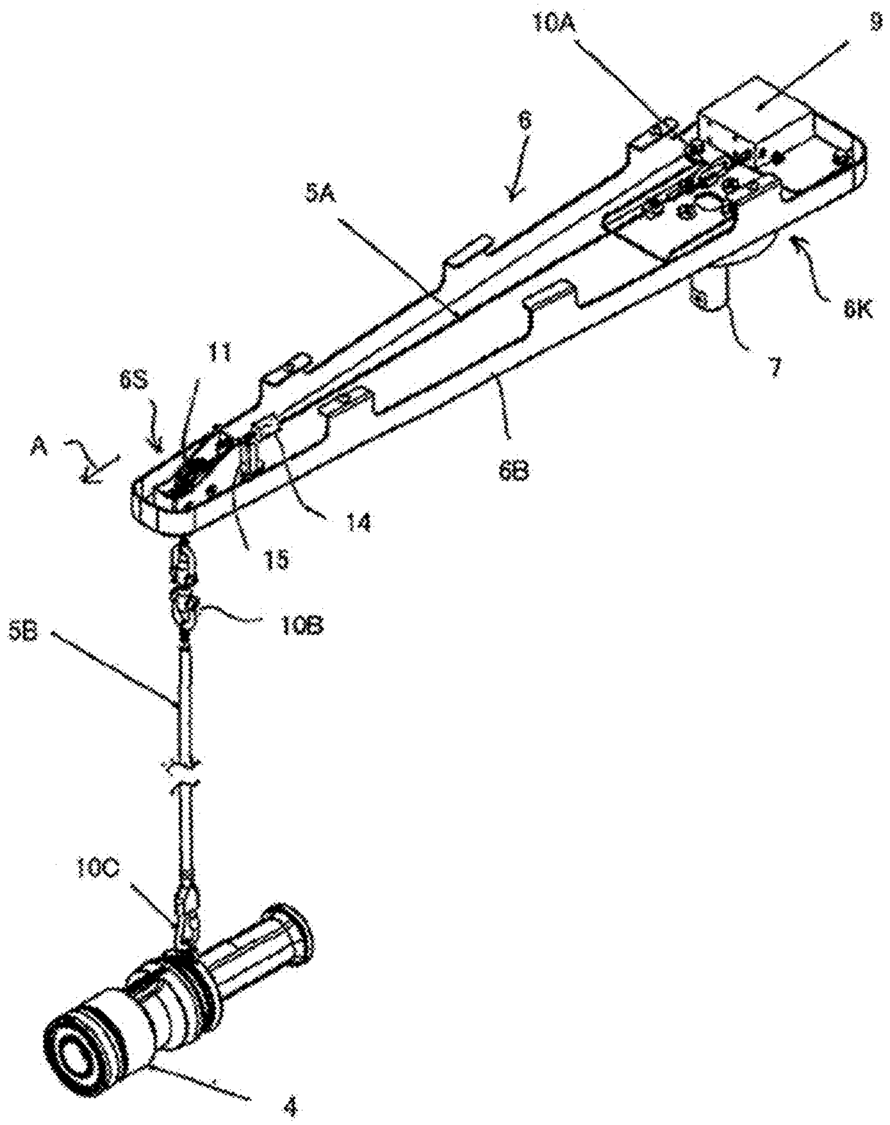

【Fig. 7】
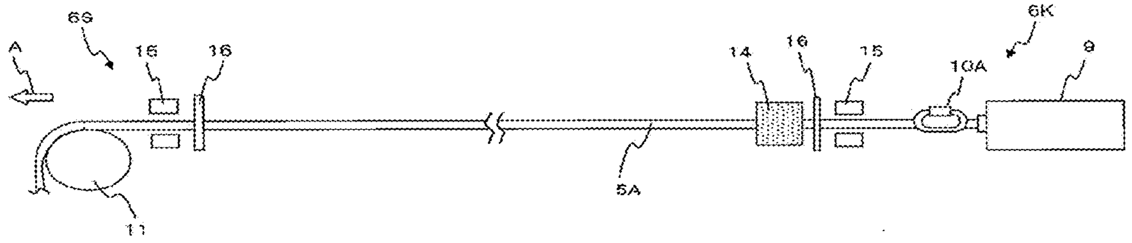

【Fig. 8】
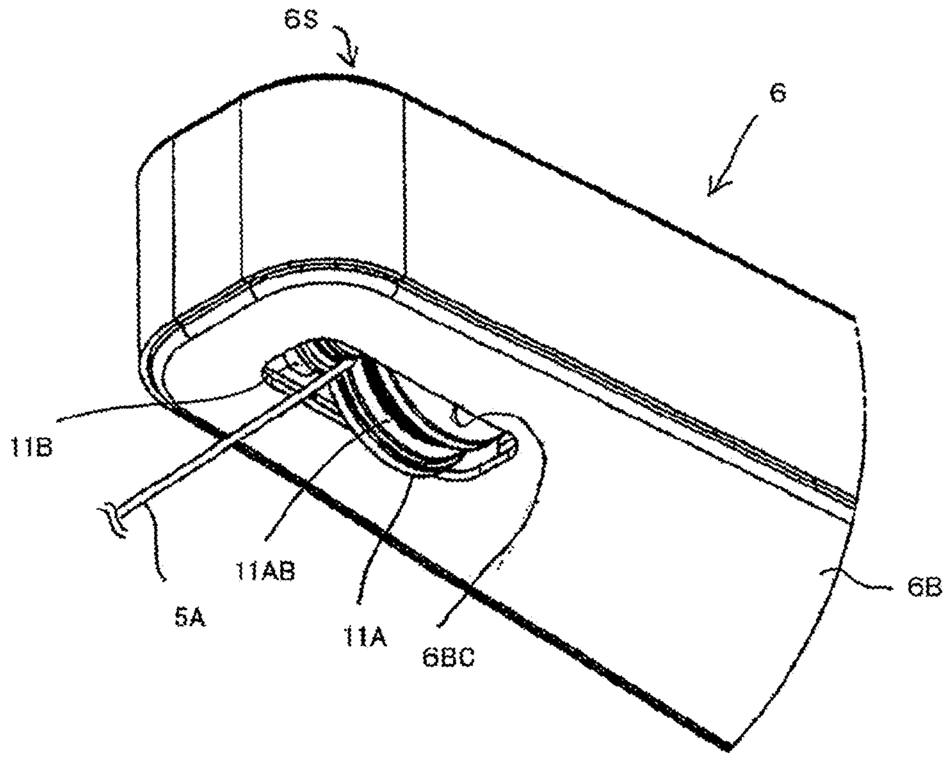
【Fig. 9】
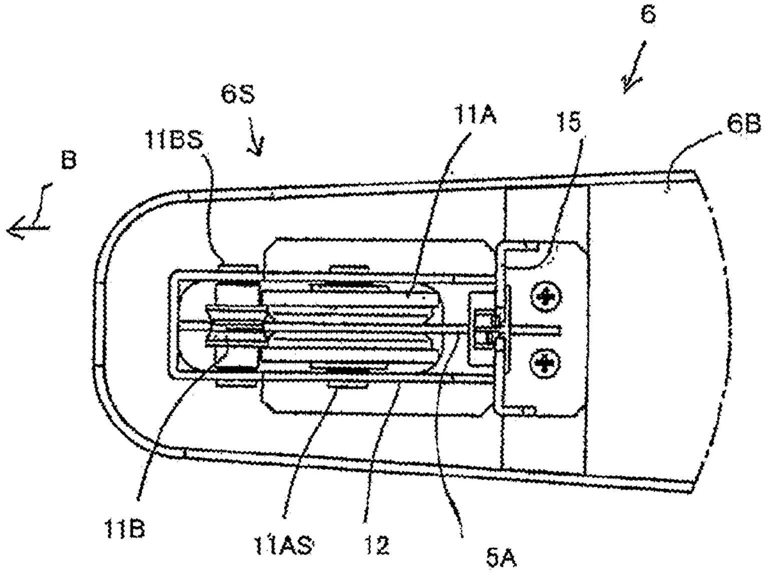

【Fig. 10】
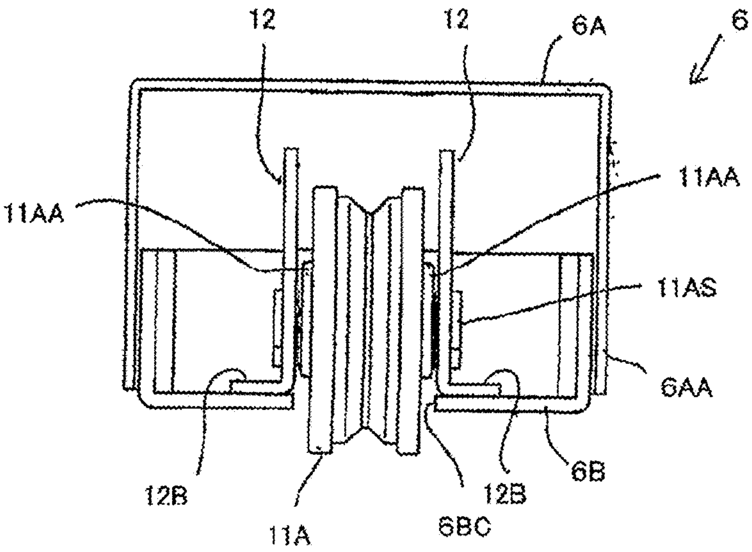
【Fig. 11】
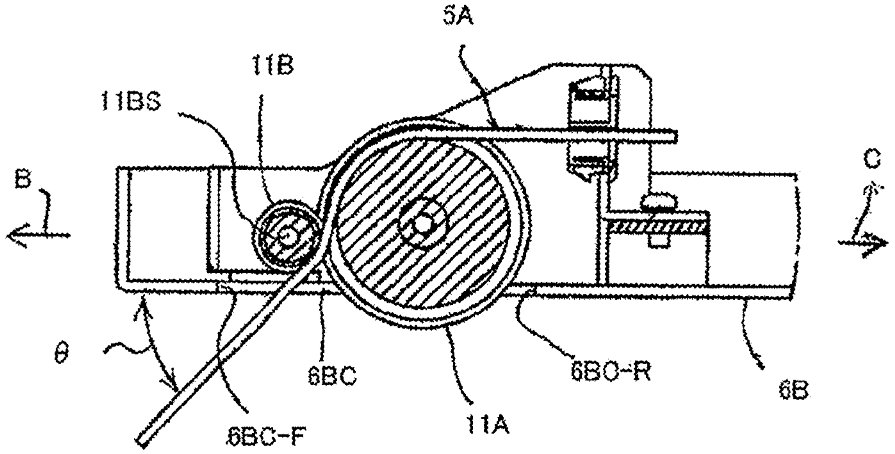

【Fig. 12】
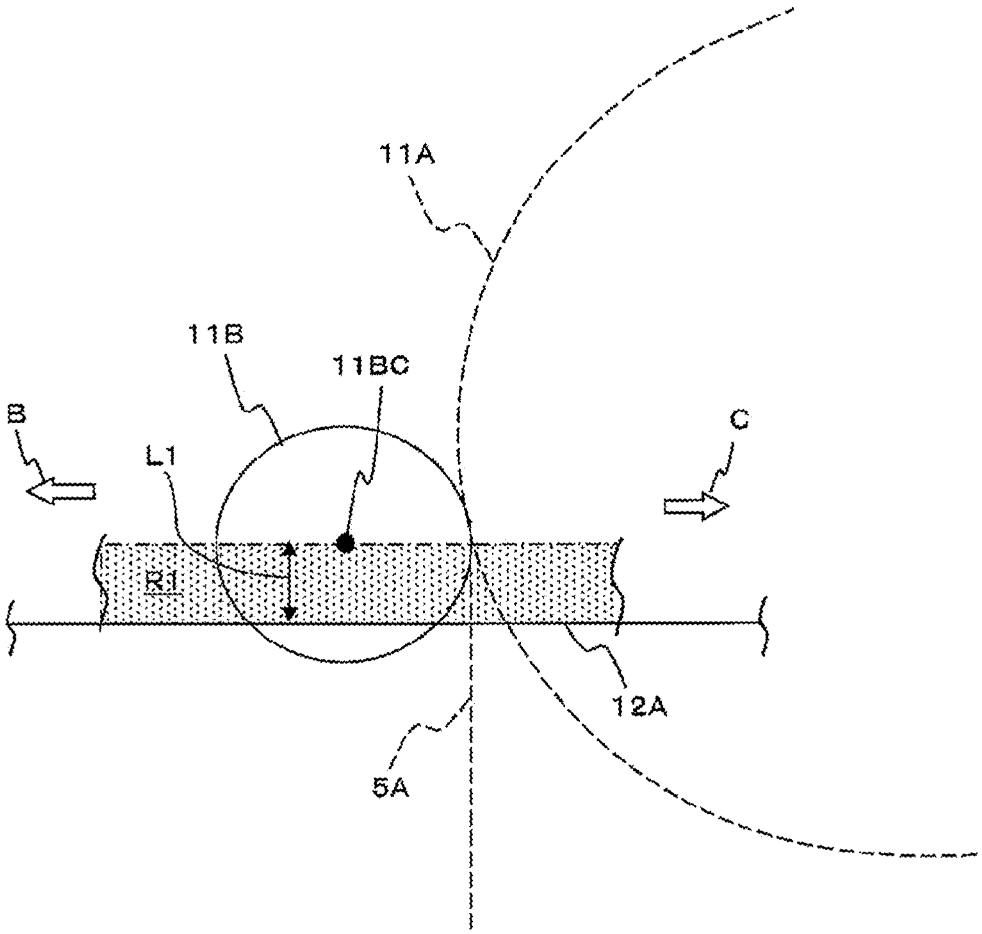
【Fig. 13】
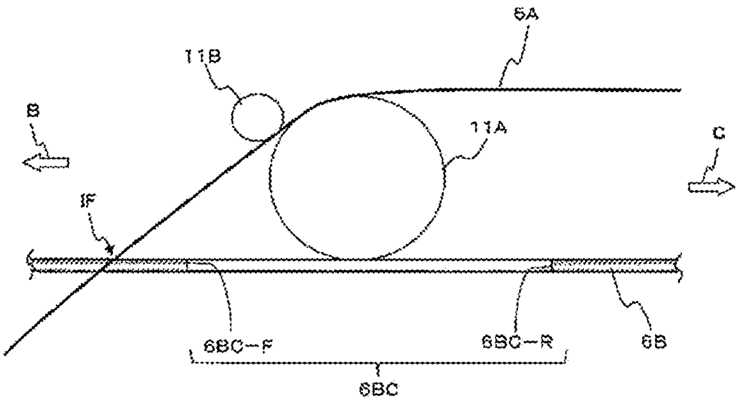

【Fig. 14】
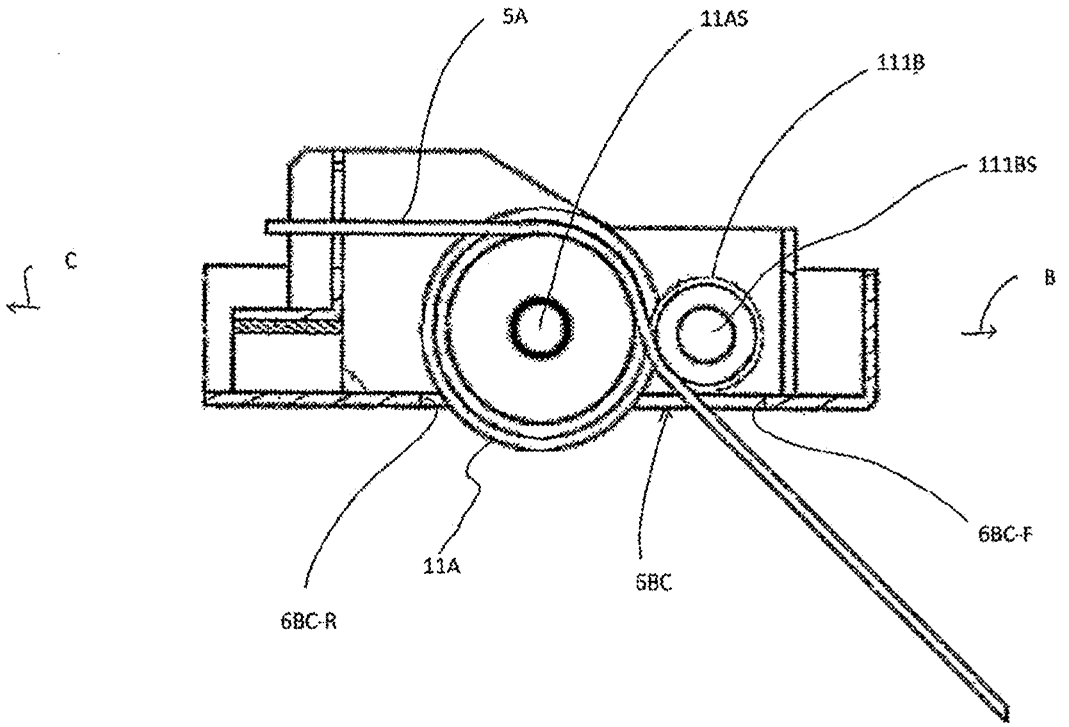

【Fig. 15】
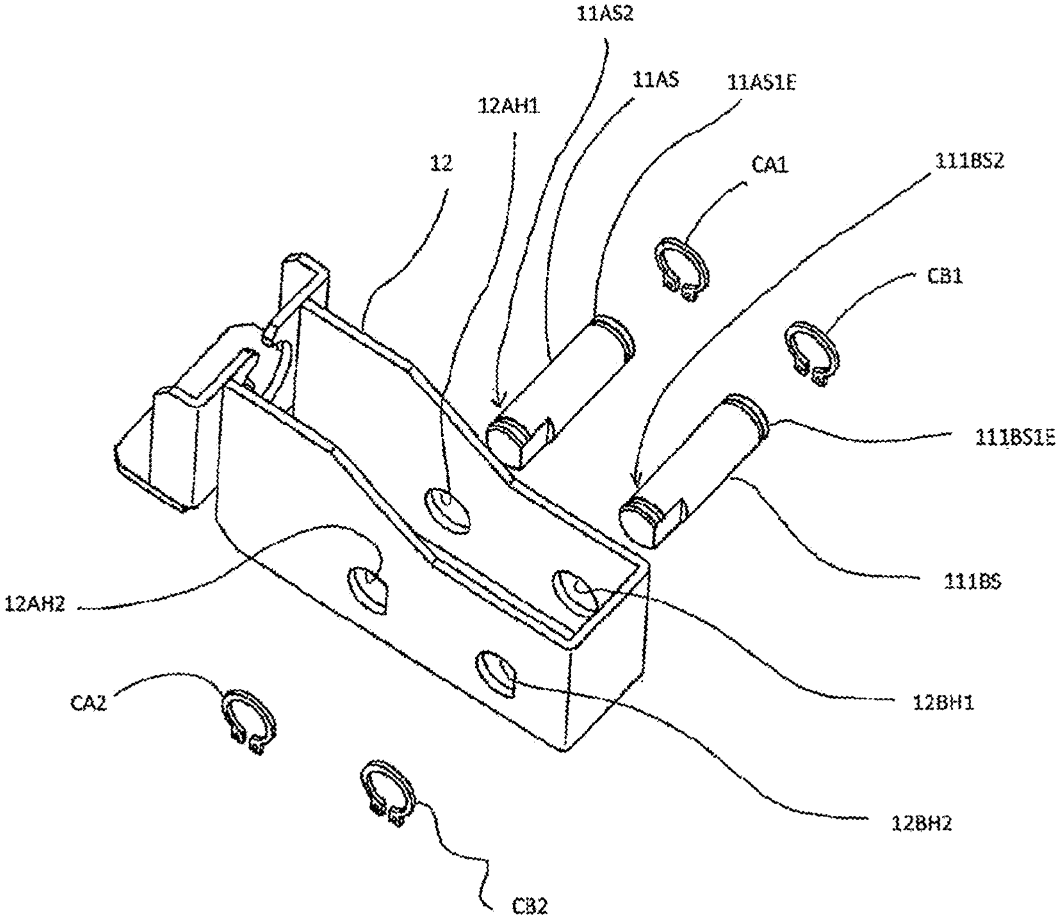

【Fig. 16】
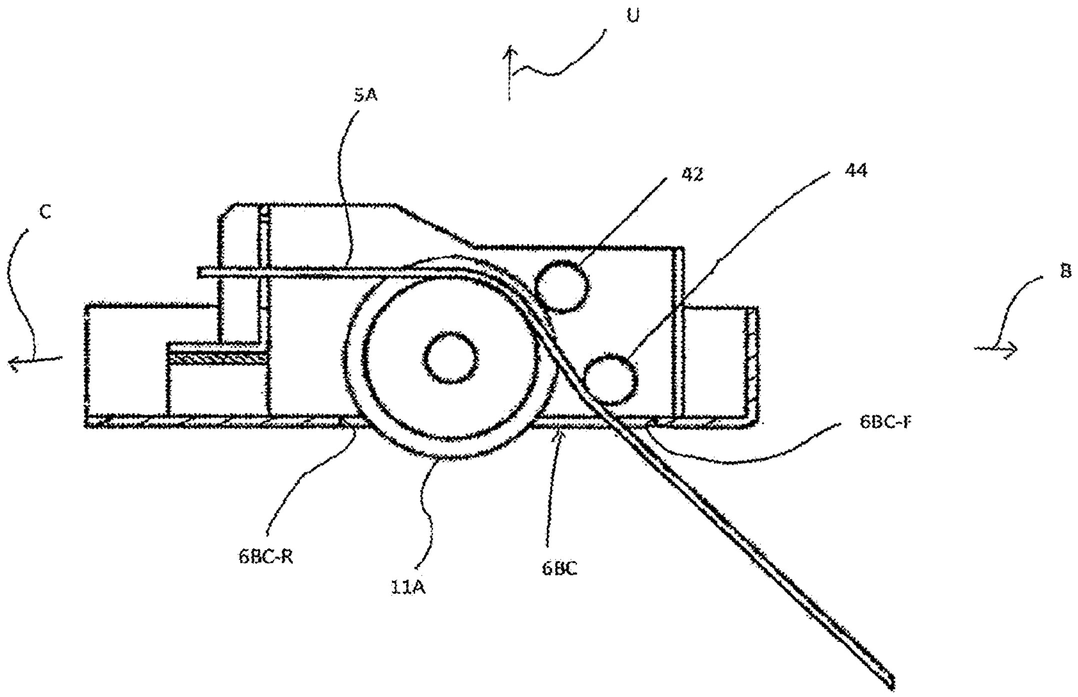

【Fig. 17】
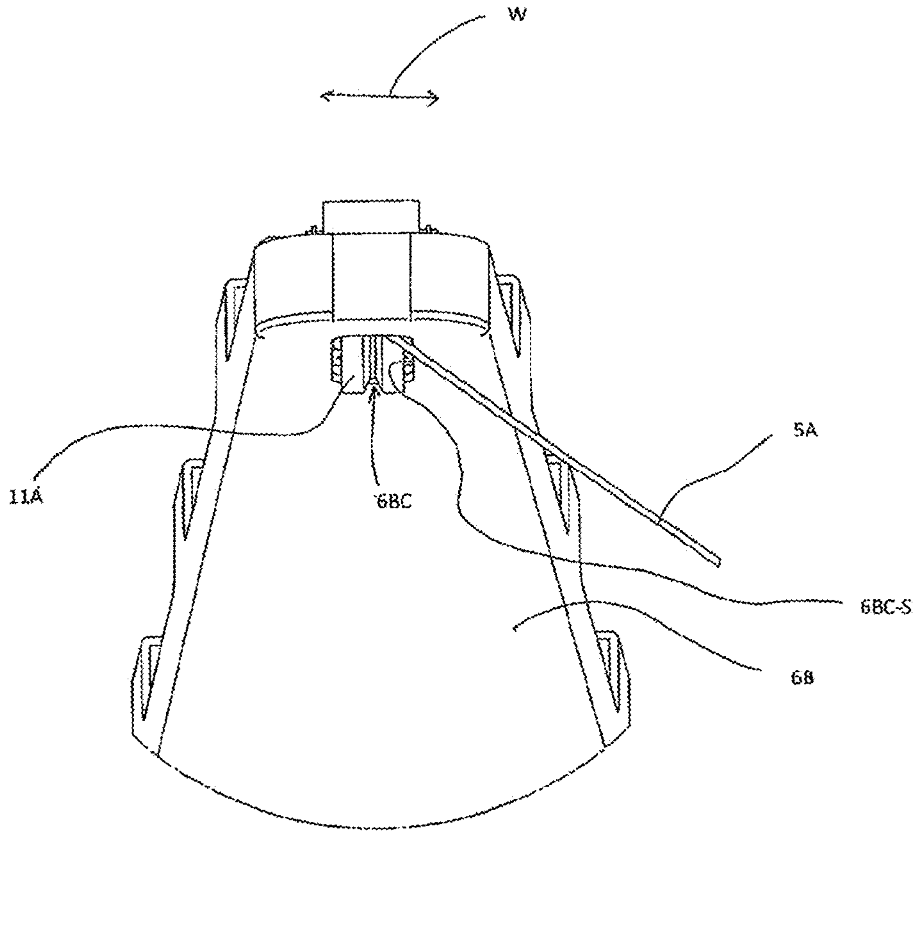

【Fig. 18】
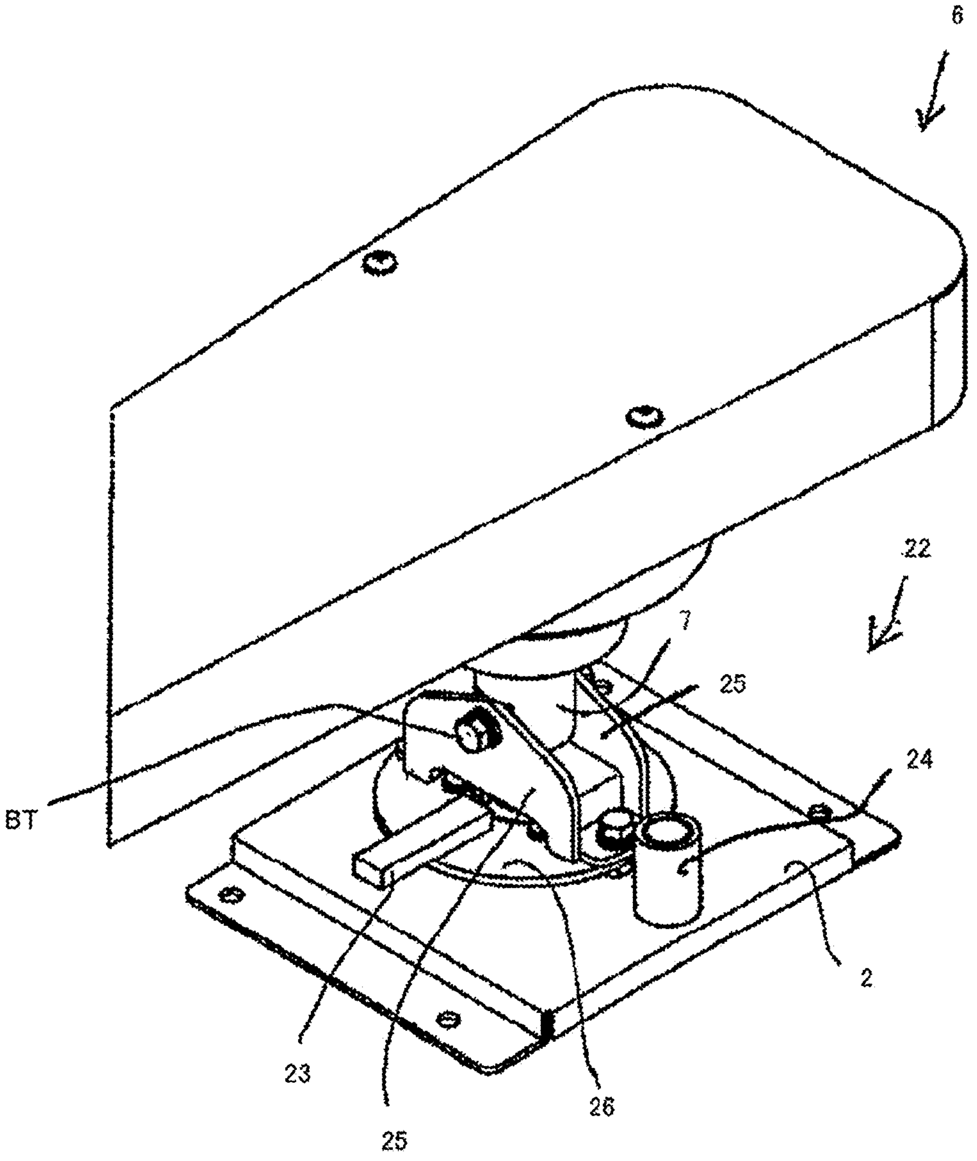

GAS FILLING DEVICE

CROSS-REFERENCE TO RELATED APPLICATIONS

The present application claims priority to Japanese Patent Application No. 2024-103658 filed on Jun. 27, 2024, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a gas filling device for supplying gas such as hydrogen gas to an FCV or the like, and in particular to a support mechanism thereof.

2. Description of the Related Art

Hydrogen has various advantages such as being environmentally friendly and contributing to energy security, and technologies for utilizing hydrogen gas are being rapidly put into practical use. One of the applications of hydrogen gas is a technology related to a gas filling device that fills hydrogen gas pressurized to a high pressure (e.g., 70 MPa or more) into a fuel tank of a vehicle. The filling nozzle of the gas filling device is sturdy so that it can withstand the high pressure described above. However, since the filling nozzle is heavy, the work of removing the filling nozzle from the gas filling device and connecting it to a receptacle of the vehicle to fill the hydrogen gas is a heavy burden for the worker.

In recent years, self-service hydrogen stations have been developed, and a support arm mechanism has been proposed that allows customers to fill gas themselves with light work by supporting the filling nozzle with a support mechanism (see, for example, JP2020-133825A gazette). Although this technology is effective, the arm of the support mechanism needs to be configured to be freely extendable, which causes a problem that rainwater can get in through moving parts, causing malfunctions and hindering the filling work.

The content of JP2020-133825A gazette is incorporated herein by reference in its entirety.

BRIEF SUMMARY

The present invention has been proposed in view of the problems of the prior art described above, and an object thereof is to provide a gas filling device that can effectively prevent the infiltration of rainwater with a simple structure.

The gas filling device 1 of the present invention is characterized by including a filling mechanism, disposed within a main body housing 2, for transporting gas from a gas supply source through a gas pipe, a filling hose 3 connected to an outlet of the gas pipe of the filling mechanism, and a support arm mechanism 6 for supporting a filling nozzle 4 provided at an end of the filling hose 3 by attaching a wire 5 to the filling nozzle 4, wherein the support arm mechanism 6 being composed of an upper cover 6A having a first bent portion 6AA formed around its entire circumference facing downward, and a lower cover 6B having a second bent portion 6BA formed facing upward, and the second bent portion 6BA is located on an inner surface of the first bent portion 6AA.

In the gas filling device 1 of the present invention, it is preferable that the second bent portion 6BA is provided with a plurality of upwardly protruding guides 6BB arranged at predetermined intervals (6BB-1, 6BB-2; representative code 6BB), and the guides 6BB abut against the inner surface of the upper cover 6A. It is further preferable that the guides 6BB have fastening guides 6BB-1 fastened to the upper cover 6A and reinforcing guides 6BB-2 that suppress bending of the supporting arm mechanism 6 in a longitudinal direction.

In addition, it is preferable, in the present invention, the support arm mechanism 6 is arranged so as to be freely rotatable relative to the main body housing 2, and includes a cylindrical portion 8 which leads to an opening 7A in which a rotation shaft 7 at one end of the support arm mechanism 6 is arranged, and a rising part 21 formed on the upper part of the main body housing 2, and the rising part 21 is located on the inner surface of the cylindrical portion 8.

Further, it is preferable that a mechanical winding device (retractor) 9 that reels out and winds up a wire 5A is provided inside the support arm mechanism 6, and the wire 5A reeled out from the mechanical winding device 9 and a wire 5B that supports the filling nozzle 4 are connected by a connection member (carabiner) 10B.

In the gas filling device 1 of the present invention, it is preferable that the mechanical winding device 9 is provided at one end of the support arm mechanism 6, and a guide member is provided at the other end to guide the wire 5A reeled out from the mechanical winding device 9 to an opening 6BC formed in the lower cover 6B. In this case, the guide member includes a roller 11, and the roller 11 is composed of a reeling roller (large roller) 11A that sends the wire 5A from the mechanical winding device 9 to the opening 6BC, and a holding roller (small roller) 11B that restricts the wire 5A from moving upward, and the wire 5A is preferably sandwiched between the reeling roller 11A and the holding roller 11B. Here, it is preferable that the movement range of the wire 5A is within the range of the opening 6BC on the lower surface of the lower cover 6B, and that rainwater can be prevented from entering. It is preferable that the reeling roller 11A and the holding roller 11B are supported by a roller holding bracket 12, and the distance from the axis of the rotation shaft 11BS of the holding roller 11B to the lower edge 12A of the roller support bracket 12 is a distance that ensures the strength required for the roller support bracket 12 to reliably support the load acting on the holding roller 11B, and the direction in which the wire 5A sandwiched between the reeling roller 11A and the holding roller 11B extends is the area between a front edge 6BC-F and a rear edge 6BC-R of the opening.

In addition, an outer surface of the reeling roller 11A is preferably subjected to a step processing that protrudes outward (a large roller side edge protrusion 11AA is formed). Furthermore, the reeling roller 11A is preferably formed with a V-shaped groove 11AB. Alternatively, the diameter of the holding roller 111B is preferably set to a dimension in which the wire 5A and an arc of the outer periphery of the holding roller 111B make line contact without point contact. In the present invention, the guide member includes the roller 11, and the roller 11 preferably has a reeling roller 11A that sends the wire 5A from the mechanical winding device 9 to the opening 6BC, a first shaft 42 that is provided at a position that prevents the wire 5A from moving upward (floating up), and a second shaft 44 that is provided at a position that can guide the wire 5A to the opening 6BC and does not cause the wire 5A to interfere with the opening front edge portion 6BC-F.

According to the present invention having the above-mentioned configuration, the upper cover 6A having the first bent portion 6AA formed around the entire circumference facing downward is placed over the lower cover 6B having the second bent portion 6BA formed facing upward, and the second bent portion 6BA is positioned on the inner surface of the first bent portion 6AA, thereby making it possible to prevent rainwater from entering the interior of the support arm mechanism 6 to a necessary and sufficient degree with a simple structure without the need for a sealing structure.

In the present invention, the second bent portion 6BA is provided with a tall guide 6BB (large vertical dimension) at intervals, and when the guide 6BB abuts against the inner surface of the upper cover 6A, the work of covering the lower cover 6B with the upper cover 6A and attaching it becomes easy. Also, with the fastening guide 6BB-1 and the reinforcing guide 6BB-2 of the guide 6BB, the upper cover 6A can be screwed at the fastening guide 6BB-1, and the moment of inertia of the area where they are provided can be increased, thereby suppressing bending of the arm 6 in the longitudinal direction.

In addition, in the present invention, the support arm mechanism 6 is arranged to be freely rotatable relative to the main body housing 2, and is provided with the rising part 21 formed on the upper part of the main body housing 2 on the inner surface of the cylindrical portion 8 which leads to an opening 7A in which the pivot shaft 7 at one end of the support arm mechanism 6 is arranged, and the rising part 21 is positioned on the inner surface of the cylindrical portion 8, which configuration enables to prevent rainwater from entering the main body housing 2.

Furthermore, the mechanical winding device 9 that reels out and winds the wire 5A is provided inside the support arm mechanism 6, and the wire 5A reeled out from the mechanical winding device 9 and the wire 5B that supports the filling nozzle 4 are connected by the connection member 10B. With this configuration, if a problem occurs with the mechanical winding device 9 or the wire 5A, only the wires 5A, 5B or the attached members between the connection members 10A, 10B, 10C can be replaced without replacing the entire member attached to the wire 5A, making part replacement easy.

BRIEF DESCRIPTION OF THE DRAWINGS

FIG. 1 is an overall perspective view showing an embodiment of a gas filling device according to the present invention.

FIG. 2 is a perspective view of an upper cover of the support arm mechanism of the gas filling device shown in FIG. 1.

FIG. 3 is a perspective view of a lower cover of the support arm mechanism of the gas filling device shown in FIG. 1.

FIG. 4 is a cross-sectional view showing a mounting structure of a base of the support arm mechanism and a top of the gas filling device.

FIG. 5 is a perspective view showing a panel of a bearing portion provided at a connection point between a top of the gas filling device and an arm base portion.

FIG. 6 is a perspective view showing wires and related members from the support arm mechanism to a filling nozzle.

FIG. 7 is a schematic diagram of members related to the wire on a mechanical winding device side.

FIG. 8 is a perspective view showing an opening for passing the wire on the mechanical winding device side provided in a bottom surface of the lower cover at a tip of the arm, and a roller provided in the opening.

FIG. 9 is a plan view showing the arrangement of rollers at the tip of the arm.

FIG. 10 is a front view showing the roller mounting state.

FIG. 11 is a side view showing an example of the relative positional relationship between a large roller and a small roller.

FIG. 12 is a side view showing the relative positional relationship between the large roller and the small roller in the example of FIG. 11.

FIG. 13 is a side view showing the relative positional relationship between the large roller and the small roller in the example of FIG. 11, and is a side view different from FIG. 12.

FIG. 14 is a side view showing a relative positional relationship between the large roller and the small roller in an example different from that shown in FIG. 11.

FIG. 15 is an exploded perspective view of members other than the rollers of the embodiment shown in FIG. 14.

FIG. 16 is a side view showing an example different from those in FIGS. 11 to 15, illustrating the relative positional relationship between the large roller at the tip of the arm and first and second shafts.

FIG. 17 is a perspective view showing an opening on the bottom surface of the lower cover and a wire on the mechanical winding device side in the example shown in FIG. 16.

FIG. 18 is a perspective view showing a torque range mechanism that supports a rotation shaft of the arm.

DETAILED DESCRIPTION

Hereinafter, embodiments of the present invention will be described with reference to the accompanying drawings. In the illustrated embodiment, the gas filling device (dispenser) 1 shown in FIG. 1 is exemplified as a hydrogen filling device for filling hydrogen. In FIG. 1, the gas filling device 1 is a device that supplies pressurized fuel gas (e.g., hydrogen gas) from a gas supply source (not shown) through a gas pipe to a fuel tank of a fuel cell vehicle (FCV: not shown) to fill it, and is installed in a facility called a gas supply station. The gas filling device 1 includes a filling mechanism in a main body housing 2, a filling hose 3 connected to an outlet of a gas pipe (not shown) in the filling mechanism, and a filling nozzle 4 provided at the tip of the filling hose 3. In the illustrated embodiment, a hydrogen gas filling device is exemplified, but the illustrated embodiment can also be applied to CNG gas and other gas filling devices. In addition, other configurations and effects of the filling mechanism (not shown) are similar to those of a conventionally known filling mechanism.

In FIG. 1, on a top surface of the main body housing 2 equipped with the filling hose 3 and the filling nozzle 4 is provided with a support arm mechanism 6. A wire 5B hangs down from a tip 6S of the support arm mechanism 6, and the hanging tip of the wire 5B is connected to the filling nozzle 4 via a connection member (carabiner) 10C. Although not shown in FIG. 1, the other end of the wire 5B is connected to a mechanical winding device 9 (retractor: see FIG. 6) housed in a base 6K of the support arm mechanism 6. The mechanical winding device 9 is provided with a rotational force imparting mechanism that imparts a constant rotational force when a wire reel that winds and unwinds the wire rotates forward or backward. Furthermore, the mechanical winding device 9 is provided with a wire holding mechanism that holds the wire (at the position at that time) when the winding and unwinding of the wire is stopped. The filling nozzle 4 is suspended by the wire 5B, and the weight of the filling hose 3 and the filling nozzle 4 is supported by the support arm mechanism 6. Therefore, when hydrogen filling work is performed using the heavy filling hose 2 and filling nozzle 4, the support arm mechanism 6 supports the weight of the filling hose 2 and filling nozzle 4, thereby reducing the burden on the worker performing the gas filling work. The configuration including the wire 5 from the mechanical winding device 9 (not shown in FIG. 1) to the filling nozzle 4 will be described later with reference to FIGS. 6 and 7.

In FIG. 1, the support arm mechanism 6 is disposed rotatably relative to the main body housing 2. Although not clearly shown in FIG. 1, the rotation shaft disposed at the base 6K of the support arm mechanism 6 is supported by a bearing on the main body housing 2. The mounting structure of the base 6K of the support arm mechanism 6 on the main body housing 2 side will be described later with reference to FIGS. 4 and 5. Rotation restricting means for restricting the rotation of the rotation shaft of the support arm mechanism 6 will be described later with reference to FIG. 14. In addition to the support arm mechanism 6, a blast wave release means 13 is disposed on the upper part of the main body housing 2. The blast wave release means 13 is configured to prevent danger to the user by releasing the blast in the event of an explosion inside the main body housing 2, and to prevent damage to the main body housing 2 and the components of the gas filling device 1. In FIG. 1, a reference numeral 31 denotes a display in the gas filling device 1, and a reference numeral 32 denotes ventilation slits in the main body housing 2.

The support arm mechanism 6 shown in FIG. 1 will be further described with reference to FIGS. 2 to 4. The support arm mechanism 6 has an upper cover 6A shown in FIG. 2 and a lower cover 6B shown in FIG. 3, and is configured by covering the lower cover 6B with the upper cover 6A. In the support arm mechanism 6 shown in FIGS. 2 and 3, the part on the side with a larger width is the base 6K, and the part on the opposite side of the base 6K with a smaller width is the tip 6S. In FIG. 2, the peripheral part of the upper cover 6A is provided with a first bent part (protrusion) 6AA that protrudes downward (toward the lower cover 6B) all around. The peripheral part of the upper surface of the upper cover 6A shown in FIG. 2 has a total of four screw holes H1 for attaching the lower cover 6B formed all around. Although not shown, in the prior art, in order to prevent liquid from entering the support arm, a lid body is fastened to a hollow structure with eleven screws via a sealant. In contrast, in the illustrated embodiment, the upper cover 6A is simply placed over the lower cover 6B and fastened together with screws S, so that the labor required for assembly is extremely small.

The lower cover 6B shown in FIG. 3 has a second bent portion 6BA that protrudes upward along the entire periphery. The second bent portion 6BA has a total of six tall guides 6BB (fastening guides 6BB-1 and reinforcing guides 6BB-2) that are intermittently formed on the periphery. The upper end of the guide 6BB is flat. When assembling the upper cover 6A and the lower cover 6B, the upper cover 6A is placed over the lower cover 6B so that the second bent portion 6BA of the lower cover 6B is positioned on the inner surface of the first bent portion 6AA of the upper cover 6A. As a result, the flat portion at the upper end of the guide 6BB abuts against the inner surface of the upper cover 6A to support the upper cover 6A. Here, if the height of the second bent portion 6BA is made the same as that of the guide 6BB over the entire circumference of the edge of the lower cover 6B, the friction between the second bent portion 6BA and the first bent portion 6AA will be too large, and there is a risk that the first bent portion 6AA will not fit into the second bent portion 6BA when the upper cover 6A is placed over the lower cover 6B. In addition, if the inclinations of the second bent portion 6BA and the first bent portion 6AA are different, it will be difficult to place the upper cover 6A over the lower cover 6B.

In an actual product, it is difficult to always perfectly align the relative positions of the first bent portion 6AA in the upper cover 6A and the second bent portion 6BA in the lower cover 6B. Therefore, in the illustrated embodiment, the second bent portions 6BA having the same height as the guides 6BB that reaches the upper cover when the upper cover 6A is placed on the lower cover 6B is not formed on the entire circumferential edge of the lower cover 6B. When the upper cover 6A is placed on the lower cover 6B, only the six guides 6BB (the fastening guides 6BB-1 and the reinforcing guides 6BB-2) that are provided intermittently in the circumferential direction of the lower cover 6B reach the upper cover. As a result, even if inclinations of the second bent portions 6BA and the first bent portions 6AA differ slightly from design values, the upper cover 6A can be reliably and easily placed on the lower cover 6B and integrated.

As described above, the lower cover 6B is provided with the second bent portion 6BA formed around the entire periphery in the peripheral direction, and the guides 6BB (the fastening guides 6BB-1 and the reinforcing guides 6BB-2) formed at six points intermittently in the peripheral direction. In other words, since there is a recess between the adjacent guides 6BB, the recessed portions become so-called "thin portions." Therefore, the lower cover 6B can be made lighter in weight than when the guides 6BB are formed around the entire periphery in the peripheral direction of the lower cover 6B.

In FIG. 3, of the six guides 6BB of the lower cover 6B, two guides 6BB-1 formed on the tip 6S side (left side in FIG. 3) of the support arm mechanism 6 and two guides 6BB-1 formed on the base 6K side (right side in FIG. 3) (a total of four guides 6BB-1: fastening guides) have screw holes H2 formed in their flat portions. On the other hand, in the region between the fastening guide 6BB-1 on the tip 6S side of the support arm mechanism 6 and the fastening guide 6BB-1 on the base 6K side of the support arm mechanism 6, two guides (reinforcement guides) 6BB-2 are located, but no screw holes H2 are formed in the flat portions of the reinforcing guides 6BB-2.

The screw holes H2 formed in the flat portions of the four fastening guides 6BB-1 are provided so as to align with the screw holes H1 formed in the upper cover 6A when the upper cover 6A is placed over the lower cover 6B, and the upper cover 6A is fixed in place over the lower cover 6B by fastening screws S into the screw holes H1 in the upper cover 6A and the screw holes H2 in the flat portions of the guides 6BB-1. In other words, the four fastening guides 6BB-1 on the tip 6S side and base 6K side of the support arm mechanism 6 in the lower cover 6B function as fastening members that fasten the upper cover 6A.

No screw holes are formed on the flat surface at the top end of the reinforcing guide 6BB-2, and it does not contribute to fastening to the upper cover 6A. However, when an external force is applied that bends the support arm mechanism 6 in the short direction, the moment of inertia at the location where the reinforcing guide 6BB-2 is provided becomes large, and the entire support arm mechanism 6 becomes difficult to bend. Therefore, the reinforcing guide 6BB-2 acts as a reinforcing member that makes the support arm mechanism 6 difficult to bend against external forces. In FIG. 3, a reference numeral 7 denotes the rotation shaft of the support arm mechanism 6, and the support arm mechanism 6 is freely rotatable relative to the main body housing 2 by the rotation shaft 7 and a bearing on the main body housing 2 side.

As described above, the support arm mechanism 6 in the illustrated embodiment is configured by covering the lower cover 6B in FIG. 3 with the upper cover 6A in FIG. 2. This makes it possible to prevent rainwater from penetrating into the support arm mechanism 6 with a simple structure without disposing a seal structure. The waterproof performance required for the support arm mechanism 6 of the gas filling device 1 according to the illustrated embodiment is such that it is not adversely affected by water spraying from above and water spraying from the area between the vertical surface and the surface inclined at 60° to the hanging surface (equivalent to standard IPX3: waterproof grade level 3). According to the inventor's experiment, by covering the lower cover 6B with the upper cover 6A, waterproof performance sufficient to satisfy the waterproof grade of the standard IPX3 (sufficiently withstands the IPX3 waterproof test) was exhibited. In addition, in the support arm mechanism 6 according to the illustrated embodiment, it is sufficient to cover the lower cover 6B with the upper cover 6A, there is no need to screw the cover body around the entire circumference or use a sealant, thereby assembly work becomes easy, and weight reduction, miniaturization, and reduction in the number of parts can be achieved.

Next, a structure for supporting the support arm mechanism 6 rotatably relative to the main body housing 2 will be described with reference to FIGS. 4 and 5. In FIG. 4, the rotation shaft 7 for rotating the support arm mechanism 6 is provided at the base 6K of the support arm mechanism 6. A bearing 20 for supporting the rotation shaft 7 is provided on the main body housing 2 side. Here, it is necessary to reliably prevent water from entering the bearing 20. For this reason, in the illustrated embodiment, as shown in FIG. 5, a rising part 21 formed of a cylindrical protrusion protruding upward (towards the support arm mechanism 6) is provided at the top 2A of the main body housing 2. As shown in FIG. 4, a cylindrical portion (hanging portion) 8 formed of a cylindrical protrusion protruding downward is provided near the base 6K side of the support arm mechanism 6. The cylindrical portion 8 is in communication with an opening 7A in which the rotation shaft 7 is disposed. The cylindrical portion 8 is configured to cover the rising part 21 from above, and the rising part 21 is concentrically disposed on the inner surface of the cylindrical portion 8. Although not clearly shown, the dimension by which the rising part 21 (see FIG. 5) protrudes upward is set to be, for example, 300% to 350% higher than the dimension by which a similar member in an existing gas-filling device protrudes.

With this configuration, even if water is sprayed from the area above the support arm mechanism 6 and the area between the vertical plane and the plane inclined at 60 degrees from the vertical plane (even if water is sprayed in a manner similar to that of the IPX3 standard, waterproofing level 3), water is prevented from seeping in beyond the cylindrical portion 8 and the rising part 21 and reaching the bearing 20 located radially inward. The above-mentioned effect was confirmed by experiments conducted by the inventor.

FIG. 6 shows the internal structure of the support arm mechanism 6. For the sake of simplicity, the upper cover 6A is omitted in FIG. 6, and only the lower cover 6B is shown. The base 6K side (right side in FIG. 6) of the support arm mechanism 6 is the side that is rotatably arranged on the main body housing 2 (not shown in FIG. 6), and is provided with the rotation shaft 7 and the like. The tip 6S side (left side in FIG. 6) of the support arm mechanism 6 is the side from which the wire 5B connected to the filling nozzle 4 hangs down, and is provided with the roller 11 and the like. The configuration and function of the roller 11 will be described later with reference to FIGS. 8 to 13. Here, the support arm mechanism 6 according to the illustrated embodiment does not expand and contract in the longitudinal direction itself. The support arm mechanism 6 according to the illustrated embodiment does not have a configuration that includes an arm body and a reeling arm, but is configured with priority given to compactness and weight reduction.

Inside the base 6K side of the support arm mechanism 6, the mechanical winding device 9 is provided for unwinding and winding the wire 5A. The mechanical winding device 9 is a known mechanism for winding the wire 5 with mechanical power such as a spring. Although not clearly illustrated, the mechanical winding device 9 in the illustrated embodiment is smaller and lighter than a mechanical winding device provided in an existing gas filling device. The mechanical winding device 9 and the mechanical winding device side wire 5A (the wire unwound from the mechanical winding device 9) are connected with a first connecting part 10A (e.g., a carabiner). The mechanical winding device side wire 5A and the filling nozzle side wire 5B (the wire supporting the filling nozzle 4) are connected with a second connecting part 10B (e.g., a wire coupling). The filling nozzle 4 and the filling nozzle side wire 5B are connected by a third connecting part 10C (e.g., a carabiner). In the illustrated embodiment, a buffer rubber 14, a stopper 15, a washer 16, etc. are interposed on the wire 5A on the mechanical winding device side.

With the above-mentioned configuration, for example, when replacing the components shown in FIG. 7 described below (the components interposed between the first connecting part 10A and the second connecting part 10B, such as the mechanical winding device side wire 5A, the buffer rubber 14, the stopper 15, and the washer 16), the connection between the first connecting part 10A and the second connecting part 10B is released and only the components that need to be replaced are replaced, without the need to remove the components that do not need to be replaced (such as the mechanical winding device 9, the roller 11, the filling nozzle side wire 5B, the filling nozzle 4, etc.). This makes part replacement easy.

Although not shown in FIG. 6, in the illustrated embodiment, the mechanical winding device side wire 5A and the filling nozzle side wire 5B are coated with a synthetic resin (e.g., polyamide) to provide good sliding properties. With this, the mechanical winding device side wire 5A is smoothly pulled out and wound, and wear of the roller 11 used therefor is prevented. In addition, in the illustrated embodiment, when the third connecting part 10C is configured with a carabiner, the carabiner is a product that opens inward, not an outward opening type. If the carabiner is an outward opening type, when the carabiner accidentally opens outward, the filling nozzle 4 may fall to the ground from the outward opening and be damaged. On the other hand, if the carabiner is an inward opening type, even when the carabiner accidentally opens, the possibility that the filling nozzle 4 will come off from the inward opening carabiner is extremely low, and the filling nozzle 4 is less likely to fall to the ground and be damaged.

The arrangement of the wires in FIG. 6 is schematically shown in FIG. 7. In FIG. 7, the wire 5A on the mechanical winding device side is provided with a member for buffering the tension acting when the FCV vehicle erroneously starts or the filling nozzle 4 falls, and for buffering the force generated by other factors. That is, the buffer rubber 14 and the stopper 15 are interposed near the first connecting part 10A connected to the mechanical winding device 9 on the base 6K side of the support arm mechanism 6, and the washer 16 is interposed therebetween. The stopper 15 and washer 16 are also interposed near the roller 11 on the tip 6S side of the support arm mechanism 6. The washer 16 is provided to reduce the impact between the buffer rubber 14 and the stopper 15 when an impact (compression) is applied to the buffer rubber 14 due to an erroneous start of the FCV vehicle or when the filling nozzle 4 is dropped, or when the mechanical winding device side wire 5A is wound around the mechanical winding device 9, thereby extending the life of the buffer rubber 14.

Arranging the buffer rubber 14, the stopper 15, and the washer 16 cushions the impact (force acting in the direction of the arrow A in FIG. 7 and FIG. 6) received by the gas filling device 1. The above-mentioned configuration is also effective in cushioning when an external force acts due to a factor other than the above. Furthermore, for example, an emergency release mechanism (wire coupling) can be provided on the second connecting part 10B (not shown in FIG. 7, see FIG. 6), and when the filling nozzle 4 is pulled with a force equal to or greater than a predetermined value, the emergency release mechanism (wire coupling) can be separated to release the connection between the second connecting part 10B and the mechanical winding device side wire 5A.

The roller denoted by the reference symbol 11 in FIG. 6 will be described with reference to FIGS. 8 to 13. In FIG. 8, an opening 6BC is formed on the bottom surface of the lower cover 6B at the tip 6S of the support arm mechanism 6, and a large roller 11A (unwinding roller) and a small roller 11B (holding roller) are disposed near the opening 6BC. The large roller 11A functions as an unwinding roller that sends the wire 5A from the mechanical winding device 9 (see FIG. 6) to the opening 6BC, and the small roller 11B functions as a holding roller that restricts the mechanical winding device side wire 5A from moving upward. The mechanical winding device side wire 5A is sandwiched between the large roller 11A and the small roller 11B and extends downward from the opening 6BC (to the filling nozzle 4 side, not shown in FIG. 8). A V-shaped groove 11AB is formed in the large roller 11A, and the wire 5A on the mechanical winding device side extends within the V-shaped groove 11AB, thereby stabilizing the reeling direction of the wire 5A on the mechanical winding device side and regulating movement in the direction perpendicular to that (the direction in which the wire 5A tries to come off the large roller 11A: lateral direction).

In FIG. 8, the opening 6BC is formed only on the lower surface (bottom surface) of the lower cover 6B of the support arm mechanism 6, and does not extend to the arm tip. If the opening 6BC extended to the arm tip of the support arm mechanism 6, rainwater would sweep in from the area of the opening 6BC on the arm tip side. As will be described later, the movement range of the mechanical winding device side wire 5A is also within the range of the opening 6BC, so rainwater is prevented from seeping into the inside of the support arm mechanism 6 along the wire 5A. The inventor conducted a water spray test of the IPX3 standard (waterproof level 3) to confirm that water does not seep into the inside of the support arm mechanism 6.

In FIG. 9, which shows the large roller 11A and the small roller 11B as viewed from above the tip of the support arm mechanism 6, the mechanical winding device side wire 5A is arranged so that it is sandwiched between the large roller 11A and the small roller 11B. Here, the small roller 11B is located on the arm tip 6S side (arrow B) with respect to the large roller 11A. Arranging the mechanical winding device side wire 5A so that it is sandwiched between the large roller 11A and the small roller 11B prevents a situation in which the mechanical winding device side wire 5A comes off the large roller 11A and the small roller 11B.

As shown in FIG. 9, a rotation shaft 11AS of the large roller 11A and a rotation shaft 11BS of the small roller 11B are supported by a roller support bracket 12. As shown in FIG. 10, the roller support bracket 12 is attached to the lower cover 6B by its base portion 12B in a manner that straddles the opening 6BC. In FIG. 9, a reference numeral 15 denotes a stopper against which a washer 16 pressed by the buffer rubber 14 abuts, and is the stopper 15 described with reference to FIG. 7.

In FIG. 10, the side edge of the large roller 11A is provided with a large roller side edge protrusion 11AA that protrudes outward (in the axial direction of the rotation shaft 11AS: left and right direction in FIG. 10). In other words, the side edge of the large roller 11A is processed to have a step that protrudes outward. Providing the large roller side edge protrusion 11AA prevents the outer surface of the large roller 11A from contacting or interfering with the roller support bracket 12 or the inner edge of the opening 6BC. This prevents the paint film of the relevant part from being removed due to interference with the outer surface of the large roller 11A, which could cause rust. Furthermore, the large roller 11A rotates smoothly without interference.

Next, the relative positional relationship between the large roller 11A and the small roller 11B will be described mainly with reference to FIGS. 11 to 13. As shown in FIG. 11, the mechanical winding device side wire 5A needs to pass through the opening 6BC of the lower cover 6B smoothly, be fed out, and be wound up without interfering with the front edge 6BC-F of the opening 6BC. If the mechanical winding device side wire 5A interferes with the opening 6BC, the coating will peel off, the roller 11 will wear, and the mechanical winding device side wire 5A will not be able to be smoothly wound and fed out, and ultimately, the mechanical winding device side wire 5A may break and be unable to hold the filling nozzle 4.

As described above with reference to FIGS. 9 and 10, the rotation shaft 11BS of the small roller 11B is supported by the roller support bracket 12, but as is clear from FIG. 10, the bottom of the roller support bracket 12 fixed to the bottom surface of the lower cover 6B is naturally not lower than the lower cover 6B. In FIG. 12, if the distance L1 from the rotation center 11BC of the small roller 11B (the axis of the rotation shaft 11BS shown in FIG. 11) to the lower edge 12A of the roller support bracket 12 is short, the roller support bracket 12 must support the external force applied to the small roller 11B by the region RI formed by the short distance L1, and there is a risk that the strength (relative to the strength required to support the small roller 11B) will be insufficient. Therefore, the distance L1 needs to be set large enough to ensure that the roller support bracket 12 has the necessary and sufficient strength to support the small roller 11B. As is clear from FIG. 12, when the small roller 11B is disposed downward (toward the lower edge 12A of the roller support bracket 12), the distance L1 becomes smaller. Therefore, the small roller 11B needs to be positioned upward in FIGS. 11 and 12 so that the distance L1 from the rotation center 11BC of the small roller 11B to the lower edge 12A of the roller support bracket 12 can be increased to ensure that the region R of the roller support bracket 12 of the distance L1 (the region shown by hatching in FIG. 12) has the strength required to support the small roller 11B.

On the other hand, as shown in FIG. 13, if the position of the small roller 11B (in FIGS. 11 and 13) becomes too far up and away from the opening 6BC of the lower cover 6B, the direction in which the mechanical winding device side wire 5A extends becomes the arm tip 6S side (the arrow B side in FIGS. 11 and 13), which is an area outside the opening 6BC, so that the mechanical winding device side wire 5A interferes with the front edge 6BC-F of the opening 6BC. In FIG. 13, the area in which the mechanical winding device side wire 5A interferes with a location other than the opening 6BC is hatched and indicated by the symbol IF. Therefore, it is necessary to set the direction in which the mechanical winding device side wire 5A sandwiched between the large roller 11A and the small roller 11B extends to the arm base 6K side (the arrow C side in FIG. 13) from the front edge 6BC-F of the opening without the position of the small roller 11B becoming too far away from the opening 6BC (upward in FIG. 13). Naturally, the direction in which the mechanical winding device side wire 5A extends must be toward the arm tip 6S side (the side indicated by the arrow B) from the rear edge 6BC-R of the opening.

In order to satisfy the conditions described in FIGS. 11 to 13, the distance L1 from the axis 11BC of the rotation shaft 11BS of the small roller 11B to the lower edge 12A of the roller support bracket 12 that supports the large roller 11A and small roller 11B is a distance that ensures the strength to reliably support the load acting on the small roller 11B by the roller support bracket 12, and the direction in which the mechanical winding device side wire 5A sandwiched between the large roller 11A and the small roller 11B extends must be on the arm base 6K side (the arrow C side) of the opening front edge 6BC-F of the lower cover 6B, and on the arm tip 6S side (the arrow B side) of the opening rear edge 6BC-R.

In the illustrated embodiment, the distance L1 is set to a distance that ensures the strength of the roller support bracket 12 to reliably support the load acting on the small roller 11B. Also, the angle θ between the direction in which the mechanical winding device side wire 5A extends and the bottom surface of the lower cover 6B is set to be 30° or more, for example, 45° or more. According to experiments by the inventor, setting the angle θ in this manner allowed the mechanical winding device side wire 5A not to be interfered with the front edge 6BC-F of the opening 6BC.

As explained with reference to FIGS. 8 to 13, the roller support bracket 12 can reliably support the load acting on the small roller 11B, and the mechanical winding device side wire 5A can be prevented from interfering with the lower cover 6B (the opening 6BC of the lower cover 6B). Furthermore, rainwater is prevented from entering the support arm mechanism 6, thereby eliminating the problem that the filling operation is hindered due to malfunction of the support arm mechanism 6.

Next, with reference to FIGS. 14 and 15, a roller arrangement different from that in FIG. 11 will be described. In FIG. 14, a roller 111B corresponding to the small roller (holding roller) 11B in FIG. 11 is configured to have a larger diameter than the small roller 11B (in FIG. 11). For example, if the diameter of the small roller 11B shown in FIG. 11 is 12 mm, the diameter of the small roller 111B in FIG. 14 is set to 18 mm. According to the inventor's experiment, if the diameter of the small roller 11B is small, the wire 5A is bent in a manner with a small radius of curvature at the point sandwiched between the large roller 11A (delivery roller) and the small roller 11B. As a result, the wire 5A and the small roller 11B come into contact at only one point (point contact) on the circumference of the small roller 11B, which may cause damage to the wire 5A. On the other hand, if the diameter of the small roller 111B is increased, the wire 5A will contact the circumference of the small roller 111B not at one point, but over a certain length (area), forming a line contact, as shown in FIG. 14. Therefore, unlike in the case of point contact, the wire 5A will not be damaged. In other words, the diameter of the small roller 111B is set to a dimension that causes the wire 5A to make line contact, not point contact, with the circumference of the small roller 111B.

As shown in FIG. 15, in the case of FIG. 14, as in the case of FIG. 11, a rotation shaft 111BS of the small roller 111B and the rotation shaft 11AS of the large roller 11A are supported by the roller support bracket 12. In FIG. 15, the roller support bracket 12 has four through holes, and the rotation shaft 11AS of the large roller 11A is inserted into the through holes 12AH1 and 12AH2. Here, the through hole 12AH1 and a through hole 12BH1 are circular, but the through hole 12AH2 and a through hole 12BH2 are formed in a D-shape. The rotation shafts 11AS and 111BS have circular cross sections, but the cross sections of tip regions 11AS2 and 111BS2 are not circular, but have a shape (D-shape) complementary to the D-shaped through holes 12AH2 and 12BH2. During assembly, the rotation shaft 11AS is inserted into the through hole 12AH1, while the D-shaped tip region 11AS2 is inserted into the D-shaped through hole 12AH2. The rotation shaft 111BS is inserted into the through hole 12BH1, while the D-shaped tip region 111BS2 is inserted into the D-shaped through hole 12BH2. The rotation shaft 11AS does not rotate when the D-shaped tip region 11AS2 is inserted into the D-shaped through hole 12AH2, and the rotation shaft 111BS does not rotate when the D-shaped tip region 111BS2 is inserted into the D-shaped through hole 12BH2. Although not clearly shown, the large roller 11A is configured to rotate around the rotation shaft 11AS (so-called free rotation), and the small roller 111B is configured to rotate around the rotation shaft 111BS (free rotation).

A fitting groove is formed in each of the tip region 11AS2 having a D-shaped cross section of the rotation shaft 11AS inserted into the D-shaped through hole 12AH2, the other end 11AS1E of the rotation shaft 11AS, the tip region 111BS2 having a D-shaped cross section of the rotation shaft 111BS inserted into the D-shaped through hole 12BH2, and the other end 111BS1E of the rotation shaft 111BS, and the large roller 11A and the small roller 111B are attached to the bracket 12 by fitting the C-rings CA2, CA1, CB2, and CB1. When the rotation shafts 11AS and 111BS are fixed with low-head bolts (not shown in FIGS. 9 and 10), removing one of the low-head bolts causes the rotation shaft to spin freely, making it difficult to remove the rollers 11A and 111B because the other low-head bolt cannot be removed. On the other hand, as described above, if the rollers 11A, 111B are made rotatable about the rotation shafts 11AS, 111BS, and the rotation shafts 11AS, 111BS are not rotated, and the rotation shafts 11AS, 111BS are attached to the bracket 12 by engaging the C-rings CA2, CA1, CB2, CB1, the rollers 11A, 111B can be easily removed by disengaging the C-rings CA2, CB2. Also, installation of the rollers 11A and 111B is easy.

Although not clearly shown, in the second embodiment shown in FIGS. 14 and 15, the bending strength of the wire 5A is increased to prevent damage caused by bending the wire 5A to a small radius of curvature at the portion sandwiched between the large roller 11A (delivery roller) and the small roller 11B. Specifically, the diameter of the strands constituting the wire 5A is reduced and the number of twists is increased. The other configurations and effects of the case shown in FIGS. 14 and 15 are the same as those of the case shown in FIG. 11.

Next, an example different from that of FIGS. 11 and 14 will be described with reference to FIGS. 16 and 17. In the example of shown in FIGS. 16 and 17, instead of the small rollers (holding rollers) 11B and 111B in FIGS. 11 and 14, first and second shafts 42 and 44 having a circular cross section are provided. If the wire 5A moves upward (in the direction of the arrow U) of the support arm, there is a risk that the wire 5A will not pass through the opening 6BC properly. In FIG. 16, the first shaft 42 is provided above the wire 5A, thereby ensuring that the wire 5A passes through the opening 6BC properly, and the wire 5A is inserted and removed properly. In other words, the first shaft 42 is provided at a position that can prevent the wire 5A from moving upward. The first shaft 42 does not need to be rotatable, as long as it can prevent the wire 5A from moving upward. On the other hand, the second shaft 44 has a function of guiding the wire 5A so that it does not interfere with the front edge 6BC-F (arrow B side edge) of the opening 6BC, and is configured to be rotatable. The second shaft 44 is provided at a position where the wire 5A can be guided to the opening 6BC and where the wire 5A does not interfere with the front edge portion 6BC-F.

In FIG. 17, the dimension of the opening 6BC of the lower cover 6B in the direction of the arrow W (the width of the opening 6BC) is set so that the wire 5A does not interfere with the side edge 6BC-S of the opening 6BC. The first and second shafts 42, 44 and the large roller 11A alone cannot restrict the movement of the wire 5A in the direction of the arrow W in FIG. 17, but by appropriately setting the dimension of the opening 6BC in the direction of the arrow W, it is possible to prevent the wire 5A from interfering with the side edge 6BC-S of the opening 6BC. This makes it possible to prevent the paint of the lower cover 6B from peeling off, causing rust, and to prevent damage to the wire 5A due to the above-mentioned interference. Other configurations and effects in the cases of FIGS. 16 and 17 are the same as those in FIGS. 11 and 14.

The rotation restricting means for restricting the rotation of the rotation shaft of the support arm mechanism 6 will be described with reference to FIG. 18. A rotation restricting means 22 is provided below the rotation shaft 7 of the support arm mechanism 6. The rotation restricting means 22 includes a protruding piece 23 that is connected to the rotation shaft 7 of the support arm mechanism 6 and rotates integrally therewith, and a stopper 24 disposed on the upper surface of the main body housing 2.

The rotation shaft 7 is fixed to two roughly semicircular connection members 25 with bolts BT, and the connection members 25 are connected to a lower disk 26, and a convex piece 23 extending radially outward is fixed to the upper surface of the lower disk 26. With this structure, the lower disk 26 rotates integrally with the rotation shaft 7 of the support arm mechanism 6. Meanwhile, a single cylindrical stopper 24 is fixed to the upper surface of the main body housing 2. The convex piece 23 rotating integrally with the rotation shaft 7 abuts against the stopper 24, thereby restricting the rotation of the support arm mechanism 6. Here, since a single stopper 24 is provided, the range of rotation of the support arm mechanism 6 is wider than when multiple (e.g., two) stoppers are provided. Therefore, it is possible to accommodate the case where the filling nozzle (nozzle hook) is located on any of the front, rear, and side surfaces of the gas filling device 1.

It should be noted that the illustrated embodiments are merely examples and are not intended to limit the technical scope of the present invention.

EXPLANATION OF SYMBOLS 1 gas filling device
2 main body housing
3 filling hose
4 filling nozzle
5 wire
5A mechanical winding device side wire
5B filling nozzle side wire
6 support arm mechanism
6A upper cover
6AA first bent portion
6B lower cover
6BA second bent portion
6BB guide
6BB-1 fastening guide
6BB-2 reinforcement guide
6BC opening (opening of lower cover)
6BC-F front edge of opening
6BC-R rear edge of opening
7 rotation shaft
7A opening
8 cylindrical part
9 mechanical winding device (retractor)
10A, 10B, 10C connection members (e.g., carabiners)
11 roller
11A large roller (reeling roller)
11AA large roller side edge protrusion
11AB V-shaped groove
11AS rotation axis of large roller
11B, 111B small rollers (holding rollers)
11BS, 111BS rotation axes of small rollers
12 roller support bracket
12A lower edge of roller support bracket
21 rising part
42 first shaft
44 second shaft

The invention claimed is:

1. A gas filling device including:
- a filling mechanism for transporting gas from a gas supply source through a gas pipe;
- a main body housing having the filling mechanism therein;
- a filling hose connected to an outlet of the gas pipe of the filling mechanism; and
- a support arm mechanism for supporting, via a wire, a filling nozzle provided at a tip of the filling hose, wherein said support arm mechanism comprising:
- an upper cover having a first bent portion formed downward along its entire periphery; and
- a lower cover having a second bent portion formed upward, wherein the second bent portion is located on an inner surface of the first bent portion, the second bent portion is provided with a guide having a larger vertical dimension intermittently, the guide being in contact with an inner surface of the upper cover, the guide includes a fastening guide fastened to the upper cover, and a reinforcing guide for suppressing bending of the supporting arm mechanism in its longitudinal direction.

2. The gas filling device as claimed in claim 1, wherein said support arm mechanism is arranged to be freely rotatable relative to the main body housing, and comprises a cylindrical portion that leads to an opening in which a rotation shaft at one end of the support arm mechanism is arranged, and a rising part formed on the upper part of the main body housing, wherein said rising part is located on an inner surface of the cylindrical portion.

3. The gas filling device as claimed in claim 1, wherein a mechanical winding device that reels out and winds the wire is provided inside the support arm mechanism, and the wire reeled out from the mechanical winding device and a wire supporting the filling nozzle are connected with a connection member.

4. The gas filling device as claimed in in claim 2, wherein a mechanical winding device that reels out and winds the wire is provided inside the support arm mechanism, and the wire reeled out from the mechanical winding device and a wire supporting the filling nozzle are connected with a connection member.

* * * * *